United States Patent Office 3,382,199
Patented May 7, 1968

3,382,199
VINYL HALIDE RESIN STABILIZERS COMPRISING AN ORGANIC PHOSPHITE SORBED ONTO A FINELY-DIVIDED POROUS CARRIER
James P. Scullin, Pompton Lakes, N.J., assignor to Tenneco Chemicals, Inc., a corporation of Delaware
No Drawing. Filed Feb. 15, 1965, Ser. No. 432,884
22 Claims. (Cl. 260—23)

ABSTRACT OF THE DISCLOSURE

Vinyl halide resin compositions that have excellent heat and light stability and excellent resistance to plate-out and that retain these properties on prolonged exposure to moisture containing a solid stabilizer that comprises a liquid organic phosphite sorbed onto a finely-divided, porous, inert carrier material, such as hydrous calcium silicate. The solid phosphite stabilizers may be used alone or in combination with known metal salt stabilizers.

---

This invention relates to solid organic phosphite stabilizers for halogen-containing resins and to a method for their production. It further relates to resinous compositions that contain these stabilizers.

A rapidly expanding industry utilizing vinyl halide resins has created a need for stabilizers that will render the finished articles of manufacture more useful, more versatile in application, and more nearly permanent. During their fabrication into plastic sheets, rigid bodies, and the like, for example, vinyl halide resins are ordinarily subjected to elevated temperatures. The resins so treated tend to decompose somewhat as is evidenced by their development of color. This decomposition is especially pronounced when scrap portions of the resins are reprocessed in apparatus operated at elevated temperatures. Even though the decomposition on heating may not detract to any appreciable extent from the physical properties of the resins, the discoloration seriously restricts their use in many applications. There has therefore arisen a need for stabilized vinyl halide resin compositions that can withstand without darkening or otherwise deteriorating the heating to which they may be subjected during processing as well as the subsequent prolonged heating of the finished products.

In addition to having good heat stability, it is necessary that vinyl halide resins show little or no tendency to plate-out during processing. Plate-out is the result of the separation of one or more ingredients, usually pigments and stabilizers, from a vinyl halide resin composition during the various stages of its processing and the deposition of these materials onto the metal surfaces of the processing equipment. These deposits may cause streaking or spotting of the finished products. They may also interfere with sheet transfer from roll to roll or with the removal of the product from the mold, thereby reducing the rate of production. To be useful commercially, the compositions should also have good color, clarity, and light stability.

Organic phosphites are widely used alone or in combination with such other stabilizer components as metal salts to improve the thermal stability of vinyl halide resins and their resistance to plate-out. Unfortunately, however, these phosphites are susceptible to hydrolysis and tend to lose a part of their stabilizing properties when they are exposed to humid conditions for even relatively short periods of time.

In accordance with this invention, it has been found that vinyl halide resin compositions that have excellent heat and light stability and excellent resistance to plate-out and that retain these properties even on prolonged exposure to a humid atmosphere are obtained by incorporating into the compositions a solid stabilizer that comprises a liquid organic phosphite sorbed onto a finely-divided, porous, inert carrier material. Since these phosphite stabilizers are in the form of dry powders, they have better handling characteristics than the liquid phosphites per se, and they can be more readily incorporated into the vinyl halide compositions.

Any of the liquid organic phosphites that are ordinarily used as stabilizers in vinyl halide resin compositions may be used in the practice of this invention. These include a wide variety of secondary and tertiary alkyl phosphites, aryl phosphites, and aryl alkyl phosphites. A single organic phosphite or a mixture of two or more of these compounds may be used. The preferred phosphites are the tertiary aryl alkyl phosphites and the triaryl phosphites in which the alkyl groups are straight-chain or branched-chain groups having from 2 to 18 carbon atoms and preferably from 4 to 10 carbon atoms and the aryl groups are phenyl groups or substituted phenyl groups in which the substituents are hydroxyl, halogen, or alkyl groups having from 1 to 12 carbon atoms. Illustrative of these phosphites are the following: triphenyl phosphite, tri (p-tert. butylphenyl) phosphite, tridecyl phosphite, diphenyl butyl phosphite, diphenyl octyl phosphite, diphenyl decyl phosphite, phenyl dibutyl phosphite, penyl di-2-ethylbutyl phosphite, phenyl dioctyl phosphite, di-p-tert. octylphenyl 2-ethylhexyl phosphite, di-(nonylphenyl)-2-chloroethyl phosphite, chlorophenyl di-(β-chloropropyl) phosphite, diphenyl phosphite, di (hydroxyphenyl) phosphite, dioctyl phosphite, phenyl p-tert. butylphenyl phosphite, phenyl hexyl phosphite, chlorophenyl n-decyl phosphite, p-tert. butylphenyl butyl phosphite, phenyl n-decyl phosphite, and the like.

The solid phosphite stabilizers may be readily prepared by sorbing a liquid organic phosphite onto a finely-divided, porous, inert carrier material using standard solid-liquid blending equipment. Suitable carrier materials include silica, calcium silicate, magnesium silicate, sodium aluminum silicate, alumina, pumice, and mixtures thereof. It is generally preferred that the average particle size of the sorbent or carrier material be in the range of approximately 0.01 micron to 25 microns. Particularly satisfactory results have been obtained when the carrier was calcium silicate having an average ultimate particle size of 0.02 to 0.07 micron.

The relative amounts of liquid organic phosphite and inert carrier that are used are largely dependent upon the sorptive properties of the carrier. It is generally preferred that at least 1 part by weight of the phosphite be used per part by weight of the carrier material. When more than about 5 parts by weight of the phosphite is used per part by weight of the carrier, the stabilizer may not have the desired dry powdery form. In most cases, 2 parts to 4 parts by weight of the liquid phosphite is used per part by weight of the inert carrier.

The solid phosphite stabilizers of this invention may be used as the sole stabilizer in a vinyl halide resin. In most cases, however, it is used in combination with one or more of the commonly used metal salt stabilizers to form vinyl halide compositions that are characterized by excellent thermal stability, light stability, resistance to plate-out, color, and clarity.

Among the metal salt stabilizers that may be used in the hydrolysis-resistant stabilizers of this invention are barium, cadmium, strontium, calcium, zinc, zirconium, lead, and tin salts of monocarboxylic acids and alkylphenols. The monocarboxylic acids that may be used in the preparation of these salts include aliphatic saturated and unsaturated monocarboxylic acids having from 2 to 22 carbon atoms and aromatic acids, such as benzoic acid and alkylbenzoic acids. The useful alkylphenols are those having one or two straight-chain or branched-chain substituents each of which contains from 4 to 12 carbon atoms, such as n-butylphenol, tert. octylphenol, n-dodecylphenol, and dinonylphenol. The preferred stabilizers of this invention contain in addition to the organic phosphite component (a) a barium salt of an alkylphenol in which the alkyl group has from 4 to 12 carbon atoms or alkanoic acid having 6 to 18 carbon atoms and (b) a cadmium salt of an alkanoic acid having 6 to 18 carbon atoms, benzoic acid, or tert. butylbenzoic acid. These preferred organic phosphite-metal salt stabilizers generally contain approximately 1 part to 5 parts by weight of the organic phosphite, 1 part to 5 parts by weight of the barium salt, and 1 part to 5 parts by weight of the cadmium salt per part by weight of the carrier material.

The organic phosphite-metal salt stabilizers may be prepared by any convenient procedure. For example, a solid phosphite stabilizer which comprises a liquid organic phosphite sorbed onto a finely-divided, porous, inert carrier material may be combined with the appropriate amounts of the metal salts, and the resulting mixture added to the vinyl halide resin composition. Alternatively, the liquid organic phosphite may be blended with solutions of the metal salt stabilizers in hydrocarbon or other solvents to form a stabilizer solution that is then sorbed onto the carrier material. On removal of the solvent, a dry powdered organic phosphite-metal salt stabilizer is obtained. In another embodiment of the invention, the solid phosphite stabilizer as herein disclosed and the metal salts are added individually to the vinyl halide composition. If desired, other heat and light stabilizer components, for example polyhydric alcohols and phenols, may be included in these phosphite-metal salt stabilizers.

The use of approximately 0.5% to 8%, and preferably 1% to 4%, based on the weight of the vinyl halide resin, of these solid phosphite-metal salt stabilizers in vinyl halide resin compositions results in products that are characterized by excellent thermal and light stability and excellent resistance to plate-out and that retain these properties even after prolonged exposure to moisture.

The vinyl halide resins that may be used in the compositions of this invention are the resinous products obtained by the polymerization of a vinyl halide in the presence or the absence of a copolymerizable monomer. The term "vinyl halide resin" as used herein includes vinyl halide homopolymers, such as polyvinyl chloride, polyvinyl bromide, and polyvinylidene chloride, as well as copolymers, such as those formed by the polymerization of a vinyl halide with a comonomer, such as vinyl acetate, vinyl propionate, vinyl butyrate, vinylidene chloride, styrene, methyl methacrylate, dialkyl fumarate or maleate, and the like. The vinyl halide is ordinarily and preferably the chloride, but the bromide and fluoride may also be used. The copolymers useful in the practice of this invention are those prepared from at least 70% of vinyl halide and up to 30% of the comonomer. The invention is also applicable to mixtures containing polyvinyl chloride in a major proportion and a minor proportion of such other synthetic resins as chlorinated polyethylene, polyacrylate and polymethacrylate esters, and copolymers of acrylonitrile, butadiene, and styrene as well as to other thermoplastic resins in which organic phosphites are ordinarily employed as stabilizers.

Any of the usual plasticizers for vinyl halide resins may be used in the stabilized compositions of the present invention. These include, for example, di-2-ethylhexyl phthalate, dibutyl sebacate, tricresyl phosphate, and octyl diphenyl phosphate. The plasticizer is generally present in the amount of approximately 5 parts to 100 parts per 100 parts of resin. Other heat and light stabilizers, pigments, dyes, fillers, extenders, and the like may also be present in the stabilized resinous compositions in the amounts ordinarily employed for the purposes indicated.

As has been indicated, the solid phosphite stabilizers of this invention may be incorporated into the vinyl halide resin compositions by any convenient procedure. For example, the individual solid stabilizer components or a solid stabilizer mixture may be blended with the vinyl halide resin, plasticizer, and other ingredients at room temperature and the resulting mixture milled on rolls at 200° F. to 400° F. for a time sufficient to form a homogeneous sheet. The stabilized composition may then be removed from the mill in the form of a film or sheet of the desired thickness. It may be used as such or subjected to polishing or embossing treatment.

This invention is further illustrated by the examples that follow. In the examples, parts and percentages are by weight unless otherwise indicated.

Example 1

The effectiveness of the solid phosphite stabilizers of this invention and their ability to resist hydrolysis when exposed to a humid atmosphere were demonstrated by comparing the properties of vinyl halide resins containing them with resins containing the comparable liquid phosphite stabilizers.

Table I sets forth the composition of the stabilizers used in these tests. Stabilizers A–D are solid stabilizers prepared from a liquid phosphite and a finely-divided inert carrier alone or in combination with triisopropanolamine, a hydrolysis inhibitor. Stabilizers E–H are liquid phosphite stabilizers. Stabilizer I is a solid phosphite stabilizer that also contains stabilizing metal salts. The inert carrier used in the preparation of Stabilizers A–D and I was Micro-Cel E, a synthetic hydrous calcium silicate having an average ultimate particle size of 0.02 micron.

TABLE I

| Stabilizer | Components (Percent by weight) | | | | |
|---|---|---|---|---|---|
| | Triphenyl Phosphite | Diphenyl Decyl Phosphite | Triisopropanolamine | Calcium Silicate Micro-Cel E) | Barium/ Cadmium Stearate |
| A | 75 | | | 25 | |
| B | 74.2 | | 0.8 | 25 | |
| C | | 75 | | 25 | |
| D | | 74.2 | 0.8 | 25 | |
| E | 100 | | | | |
| F | 99 | | 1 | | |
| G | | 100 | | | |
| H | | 99 | 1 | | |
| I | | 30 | | 10 | 60 |

These stabilizers were evaluated in vinyl halide resin compositions after (a) storage in tightly stoppered bottles at 77° F. for 9 days or (b) storage in open jars at 100% relative humidity at 77° F. for 9 days.

The procedures used for the preparation and evaluation of the stabilized vinyl halide resin compositions were as follows:

To 150 parts by weight of a vinyl chloride homopolymer (Geon 101 EP) were added 75 parts by weight of di-2-ethylhexyl phthalate and a stabilizing amount of one of the stabilizers of this invention. The resulting mixture was blended at room temperature and then charged to a two-roll, steam-heated, differential speed mill whose surface temperature was maintained at 330° F. The mixture was milled for 5 minutes and then removed from the rolls as a sheet 0.045 inch in thickness.

The heat stability ratings of the compositions were determined by placing 1 x 1 inch specimens which had been cut from the milled sheets in a forced circulation air oven at 350° F. and removing specimens periodically until degradation was complete as indicated by color change. A numerical scale was used to indicate the color of the samples, with a rating of 1 indicating absence of color, 2 denoting a trace of color, 3 denoting light yellow, 4 denoting yellow, 5 denoting dark yellow, 6 denoting black edges, and 7 denoting black.

The stabilizers used and the heat-stability ratings of the compositions are given in Table II and Table III. The compositions whose ratings are reported in Table II are those containing stabilizers that had been aged in tightly stoppered bottles, while those reported in Table III contained stabilizers that had been aged in open jars at 100% relative humidity.

TABLE II.—HEAT STABILITY OF COMPOSITIONS CONTAINING STABILIZERS AGED IN TIGHTLY STOPPERED BOTTLES AT 77° F. FOR 9 DAYS

| Ex. No. | Stabilizer | Phr.* | Initial Color | Color After Indicated Number of Minutes 350° F. | | | | | | | | | |
|---|---|---|---|---|---|---|---|---|---|---|---|---|---|
| | | | | 15 | 30 | 45 | 60 | 90 | 120 | 150 | 180 | 210 | 240 |
| 2A | Stabilizer A / Barium/cadmium stearate | 1.33 / 2 | 1 | 1 | 2 | 2 | 2 | 3 | 3 | 3 | 4 | 6 | 7 |
| 2B | Stabilizer B / Barium/cadmium stearate | 1.33 / 2 | 1 | 1 | 2 | 2 | 2 | 3 | 3 | 3 | 4 | 6 | 7 |
| 2C | Stabilizer C / Barium/cadmium stearate | 1.33 / 2 | 1 | 1 | 1 | 2 | 2 | 2 | 2 | 3 | 4 | 6 | 7 |
| 2D | Stabilizer D / Barium/cadmium stearate | 1.33 / 2 | 1 | 1 | 1 | 2 | 2 | 2 | 2 | 3 | 4 | 6 | 7 |
| 2E | Stabilizer E / Barium/cadmium stearate | 1 / 2 | 1 | 1 | 1 | 1 | 2 | 2 | 2 | 3 | 3 | 6 | 7 |
| 2F | Stabilizer F / Barium/cadmium stearate | 1 / 2 | 1 | 1 | 1 | 1 | 2 | 2 | 2 | 3 | 3 | 6 | 7 |
| 2G | Stabilizer G / Barium/cadmium stearate | 1 / 2 | 1 | 1 | 1 | 1 | 2 | 2 | 2 | 3 | 3 | 6 | 7 |
| 2H | Stabilizer H / Barium/cadmium stearate | 1 / 2 | 1 | 1 | 1 | 2 | 2 | 2 | 2 | 3 | 3 | 6 | 7 |
| 2I | Stabilizer I | 3.33 | 1 | 1 | 1 | 2 | 2 | 2 | 2 | 3 | 3 | 6 | 7 |

*Parts of stabilizer per hundred parts of polyvinyl chloride.

TABLE III.—HEAT STABILITY OF COMPOSITIONS CONTAINING STABILIZERS AGED IN OPEN JARS AT 100% RELATIVE HUMIDITY AT 77° F. FOR 9 DAYS

| Ex. No. | Stabilizer | Phr. | Initial Color | Color After Indicated Number of Minutes at 350° F. | | | | | | | | | |
|---|---|---|---|---|---|---|---|---|---|---|---|---|---|
| | | | | 15 | 30 | 45 | 60 | 90 | 120 | 150 | 180 | 210 | 240 |
| 2J | Stabilizer A / Barium/cadmium stearate | 1.33 / 2 | 1 | 1 | 2 | 2 | 3 | 3 | 3 | 3 | 4 | 6 | 7 |
| 2K | Stabilizer B / Barium/cadmium stearate | 1.33 / 2 | 1 | 1 | 2 | 2 | 2 | 2 | 2 | 2 | 3 | 6 | 7 |
| 2L | Stabilizer C / Barium/cadmium stearate | 1.33 / 2 | 1 | 1 | 1 | 2 | 2 | 2 | 2 | 3 | 4 | 6 | 7 |
| 2M | Stabilizer D / Barium/cadmium stearate | 1.33 / 2 | 1 | 1 | 2 | 2 | 2 | 2 | 2 | 4 | 6 | 7 | |
| 2N | Stabilizer E / Barium/cadmium stearate | 1 / 2 | 1 | 1 | 2 | 2 | 2 | 3 | 4 | 6 | 7 | | |
| 2O | Stabilizer F / Barium/cadmium stearate | 1 / 2 | 1 | 2 | 2 | 2 | 3 | 4 | 6 | 7 | | | |
| 2P | Stabilizer G / Barium/cadmium stearate | 1 / 2 | 1 | 1 | 2 | 2 | 3 | 4 | 7 | | | | |
| 2Q | Stabilizer H / Barium/cadmium stearate | 1 / 2 | 1 | 1 | 2 | 2 | 2 | 2 | 2 | 3 | 4 | 7 | |
| 2R | Stabilizer I | 3.33 | 1 | 1 | 2 | 2 | 2 | 2 | 2 | 3 | 4 | 6 | 7 |

From the data in Tables II and III it will be seen that the ability of the solid phosphite stabilizers of this invention, that is, Stabilizers A–D and I, to protect the vinyl halide compositions from thermal degradation was not adversely affected by prolonged exposure to a humid atmosphere. On the other hand, the comparative stabilizers, that is, Stabilizers E–H, that had been exposed to moisture were appreciably less effective than those that had been stored in tightly sealed bottles.

Example 2

A liquid stabilizer that contained 5.6% of barium as barium nonylphenate, 3.0% of cadmium as cadmium 2-ethylhexoate, 1.0% of zinc as zinc 2-ethylhexoate, and 29% of diphenyl isooctyl phosphite in mineral spirits was sorbed onto finely-divided, porous silica (Cab-O-Sil) in the amount of 2.5 parts of the stabilizer per part of silica to form a dry, free-flowing powder. When evaluated as a stabilizer by the procedure described in Example 1, this solid stabilizer was found to be an effective heat and light stabilizer for vinyl halide resins and to retain this property even after prolonged exposure to moisture.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A hydrolysis-resistant solid phosphite stabilizer for vinyl halide resin compositions which comprises a liquid organic phosphite sorbed onto a finely-divided, porous, inert carrier material selected from the group consisting of silica, calcium silicate, magnesium silicate, sodium aluminum silicate, alumina, pumice, and mixtures thereof in the amount of approximately 1 part to 5 parts by weight of said liquid organic phosphite per part by weight of said carrier material.

2. A hydrolysis-resistant solid phosphite stabilizer for vinyl halide resin compositions which comprises a liquid organic phosphite selected from the group consisting of secondary and tertiary alkyl, aryl, and alkyl aryl phosphites wherein each alkyl group has from 2 to 18 carbon atoms and the aryl groups are selected from the group consisting of phenyl, hydroxyphenyl, chlorophenyl, and alkylphenyl having from 1 to 12 carbon atoms in the alkyl group sorbed onto a finely-divided, porous inert carrier material selected from the group consisting of silica, calcium silicate, magnesium silicate, sodium aluminum silicate, alumina, pumice, and mixtures thereof in the amount of 2 parts to 4 parts by weight of said liquid organic phosphite per part by weight of said carrier material.

3. A hydrolysis-resistant solid phosphite stabilizer for vinyl halide resin compositions which comprises a liquid organic phosphite selected from the group consisting of secondary and tertiary alkyl, aryl, and alkyl aryl phosphites wherein each alkyl group has from 2 to 18 carbon atoms and the aryl groups are selected from the group consisting of phenyl, hydroxyphenyl, chlorophenyl, and alkylphenyl having from 1 to 12 carbon atoms in the alkyl group sorbed onto finely-divided calcium silicate in the amount of 2 parts to 4 parts by weight of said liquid phosphite per part by weight of calcium silicate.

4. The hydrolysis-resistant solid phosphite stabilizer of claim 3 wherein the organic phosphite is triphenyl phosphite.

5. The hydrolysis-resistant solid phosphite stabilizer of claim 3 wherein the organic phosphite is diphenyl decyl phosphite.

6. The hydrolysis-resistant solid phosphite stabilizer of claim 3 wherein the organic phosphite is diphenyl isooctyl phosphite.

7. A heat and light stable resinous composition comprising a vinyl halide resin and a heat stabilizing amount of a solid phosphite stabilizer that comprises a liquid organic phosphite sorbed onto a finely-divided, porous, inert carrier material selected from the group consisting of silica, calcium silicate, magnesium silicate, sodium aluminum silicate, alumina, pumice, and mixtures thereof in the amount of approximately 1 part to 5 parts by weight of said liquid organic phosphite per part by weight of said carrier material.

8. A heat and light stable resinous composition comprising a vinyl halide resin and a heat-stabilizing amount of a solid phosphite stabilizer that comprises a liquid organic phosphite selected from the group consisting of secondary and tertiary alkyl, aryl, and alkyl aryl phosphites wherein each alkyl group has from 2 to 18 carbon atoms and the aryl groups are selected from the group consisting of phenyl, hydroxyphenyl, chlorophenyl, and alkylphenyl having from 1 to 12 carbon atoms in the alkyl group sorbed onto a finely-divided, porous inert carrier material selected from the group consisting of silica, calcium silicate, magnesium silicate, sodium aluminum silicate, alumina, pumice, and mixtures thereof in the amount of 2 parts to 4 parts by weight of said liquid organic phosphite per part by weight of said carrier material.

9. A heat and light stable resinous composition comprising a vinyl halide resin and a heat stabilizing amount of a solid phosphite stabilizer that comprises a liquid organic phosphite selected from the group consisting of secondary and tertiary alkyl, aryl, and alkyl aryl phosphites wherein each alkyl group has from 2 to 18 carbon atoms and the aryl groups are selected from the group consisting of phenyl, hydroxyphenyl, chlorophenyl, and alkylphenyl having from 1 to 12 carbon atoms in the alkyl group sorbed onto finely-divided calcium silicate in the amount of 2 parts to 4 parts by weight of said liquid organic phosphite per part by weight of calcium silicate.

10. The heat and light stable resinous composition of claim 9 wherein the stabilizer comprises triphenyl phosphite sorbed onto finely-divided calcium silicate.

11. The heat and light stable resinous composition of claim 9 wherein the stabilizer comprises diphenyl decyl phosphite sorbed onto finely-divided calcium silicate.

12. The heat and light stable resinous composition of claim 9 wherein the stabilizer comprises diphenyl isooctyl phosphite sorbed onto finely-divided calcium silicate.

13. A heat and light stable resinous composition comprising a vinyl halide resin and 0.5% to 8% based on the weight of the vinyl halide resin of a solid stabilizer that comprises (1) a liquid organic phosphite selected from the group consisting of secondary and tertiary alkyl, aryl, and alkyl aryl phosphites wherein each alkyl group has from 2 to 18 carbon atoms and the aryl groups are selected from the group consisting of phenyl, hydroxyphenyl, chloro phenyl, and alkylphenyl having from 1 to 12 carbon atoms in the alkyl group sorbed onto a finely-divided, porous, inert carrier material selected from the group consisting of silica, calcium silicate, magnesium silicate, sodium aluminum silicate, alumina, pumice, and mixtures thereof; (2) a barium salt selected from the group consisting of barium alkylphenates in which the alkyl groups have from 4 to 12 carbon atoms and barium salts of alkanoic acids having from 6 to 18 carbon atoms; and (3) a cadmium salt on an acid selected from the group consisting of alkanoic acids having from 6 to 18 carbon atoms, benzoic acid, and tert. butylbenzoic acids in the amounts of 1 part to 5 parts by weight of said liquid phosphite, 1 part to 5 parts by weight of said barium salt, and 1 part to 5 parts by weight of said cadmium salt per part by weight of said carrier material.

14. A heat and light stable resinous composition comprising a vinyl halide resin and 1% to 4% based on the weight of the vinyl halide resin of a solid stabilizer that comprises (1) a liquid organic phosphite selected from the group consisting of secondary and tertiary alkyl, aryl, and alkyl aryl phosphites wherein each alkyl group has from 2 to 18 carbon atoms and the aryl groups are selected from the groups consisting of phenyl, hydroxyphenyl, chlorophenyl, and alkylphenyl having from 1 to 12 carbon atoms in the alkyl group sorbed onto finely-divided calcium silicate; (2) a barium salt selected from the group consisting of barium alkylphenates in which the alkyl groups have from 4 to 12 carbon atoms and barium salts of alkanoic acids having from 6 to 18 carbon atoms; and (3) a cadmium salt of an acid selected from the group consisting of alkanoic acids having from 6 to 18 carbon atoms, benzoic acid, and tert. butylbenzoic acid in the amounts of 1 part to 5 parts by weight of said phosphite, 1 part to 5 parts by weight of said barium salt, and 1 part to 5 parts by weight of said cadium salt per part by weight of said calcium silicate.

15. A heat and light stable resinous composition as set forth in claim 14 wherein the barium salt in the stabilizer is barium stearate and the cadmium salt in the stabilizer is cadmium stearate.

16. A heat and light stable resinous composition as set forth in claim 14 wherein the organic phosphite in the stabilizer is triphenyl phosphite.

17. A heat and light stable resinous composition as set forth in claim 14 wherein the organic phosphite in the stabilizer is diphenyl decyl phosphite.

18. A hydrolysis-resistant solid stabilizer for vinyl halide resin compositions which comprises (1) a liquid organic phosphite selected from the group consisting of secondary and tertiary alkyl, aryl, and alkyl aryl phosphites wherein each alkyl group has from 2 to 18 carbon atoms and the aryl groups are selected from the group consisting of phenyl, hydroxyphenyl, chloro-phenyl, and alkylphenyl having from 1 to 12 carbon atoms in the alkyl group sorbed onto a finely-divided, porous, inert carrier material selected from the group consisting of silica, calicium silicate, magnesium silicate, sodium aluminum silicate, alumina, pumice, and mixtures thereof; (2) a barium salt selected from the group consisting of barium alkylphenates in which the alkyl groups have from 4 to 12 carbon atoms and barium salts of alkanoic acids having from 6 to 18 carbon atoms; and (3) a cadmium salt of an acid selected from the group consisting of alkanoic acids having from 6 to 18 carbon atoms, benzoic acid, and tert. butylbenzoic acid in the amounts of 1 part to 5 parts by weight of said liquid phosphite, 1 part to 5 parts by weight of said barium salt, and 1 part to 5 parts by weight of said cadmium salt per part by weight of said carrier material.

19. The hydrolysis resistant solid stabilizer of claim 18 wherein the finely-divided, porous, inert carrier material is calcium silicate.

20. The hydrolysis resistant solid stabilizer of claim 18 wherein the barium salt is barium stearate and the cadmium salt is cadmium stearate.

21. A hydrolysis-resistant solid stabilizer for vinyl halide resin compositions which comprises (1) a liquid organic phosphite selected from the group consisting of secondary and tertiary alkyl, aryl, and alkyl aryl phosphites wherein each alkyl group has from 2 to 18 carbon atoms and the aryl groups are selected from the group consisting of phenyl, hydroxyphenyl, chlorophenyl, and alkylphenyl having from 1 to 12 carbon atoms in the alkyl group; (2) a barium salt selected from the group consisting of barium alkylphenates in which the alkyl groups have from 4 to 12 carbon atoms and barium salts of alkanoic acids having from 6 to 18 carbon atoms; and (3) a cadmium salt of an acid selected from the group consisting of alkanoic acids having from 6 to 18 carbon atoms, benzoic acid, and tert. butylbenzoic acid, said liquid phosphite, barium salt, and cadmium salt being sorbed onto a finely-divided, porous inert carrier material selected from the group consisting of silica, calcium silicate, magnesium silicate, sodium aluminum silicate, alumina, pumice, and mixtures thereof and said stabilizer containing 1 part to 5 parts by weight of said phosphite, 1 part to 5 parts by weight of said barium salt, and 1 part to 5 parts by weight of said cadmium salt per part by weight of said carrier material.

22. The hydrolysis-resistant solid stabilizer of claim 21 wherein the finely-divided, porous, inert carrier material is calcium silicate, the barium salt is barium stearate, and the cadmium salt is cadmium stearate.

References Cited

UNITED STATES PATENTS

| | | | |
|---|---|---|---|
| 2,564,646 | 8/1951 | Leistner et al | 260—45.7 |
| 2,997,454 | 8/1961 | Leistner et al. | 260—45.8 |
| 3,054,769 | 9/1962 | Pike | 260—37 |
| 3,180,754 | 4/1965 | Acker et al. | 117—100 |
| 3,235,521 | 2/1966 | Pitrot et al. | 260—23 |
| 3,266,924 | 8/1966 | Halske et al. | 106—308 |
| 3,304,197 | 2/1967 | Pundsack et al. | 117—126 |

OTHER REFERENCES

Linde Co. bulletin, "Chemical Loaded Molecular Sieves," 1959, p. 2.

DONALD E. CZAJA, *Primary Examiner.*

R. A. WHITE, *Assistant Examiner.*